United States Patent
Czosnowski et al.

(10) Patent No.: US 9,568,701 B2
(45) Date of Patent: Feb. 14, 2017

(54) DROP CABLE ASSEMBLY

(71) Applicant: OFS FITEL, LLC, Norcross, GA (US)

(72) Inventors: Wladyslaw Czosnowski, Duluth, GA (US); Daniel Hendrickson, Roswell, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/800,109

(22) Filed: Jul. 15, 2015

(65) Prior Publication Data

US 2016/0018616 A1  Jan. 21, 2016

Related U.S. Application Data

(60) Provisional application No. 62/024,582, filed on Jul. 15, 2014, provisional application No. 62/026,847, filed on Jul. 21, 2014, provisional application No. 62/041,249, filed on Aug. 25, 2014, provisional application No. 62/043,016, filed on Aug. 28, 2014, provisional application No. 62/056,805, filed on Sep. 29, 2014.

(51) Int. Cl.
*G02B 6/00* (2006.01)
*G02B 6/44* (2006.01)
*G02B 6/125* (2006.01)
*G02B 6/28* (2006.01)
*G02B 6/38* (2006.01)
*H04B 10/27* (2013.01)
*H04Q 11/00* (2006.01)

(52) U.S. Cl.
CPC ............. *G02B 6/4472* (2013.01); *G02B 6/125* (2013.01); *G02B 6/2804* (2013.01); *G02B 6/3897* (2013.01); *G02B 6/4446* (2013.01); *G02B 6/4452* (2013.01); *G02B 6/4454* (2013.01); *H04B 10/27* (2013.01); *H04Q 11/0067* (2013.01)

(58) Field of Classification Search
CPC ... G02B 6/4452; G02B 6/4446; G02B 6/4454; G02B 6/4472
USPC .................... 385/135–138, 53, 59
See application file for complete search history.

(56) References Cited

U.S. PATENT DOCUMENTS

| | | | | |
|---|---|---|---|---|
| 6,539,147 B1* | 3/2003 | Mahony | ............... | G02B 6/4451 385/24 |
| 6,668,127 B1* | 12/2003 | Mahony | ............... | G02B 6/4451 385/135 |
| 7,218,828 B2 | 5/2007 | Feustel et al. | | |
| 7,277,614 B2 | 10/2007 | Cody et al. | | |
| 7,463,803 B2* | 12/2008 | Cody | ................... | G02B 6/4475 385/100 |
| 7,609,923 B2* | 10/2009 | Baucom | ............... | G02B 6/4475 385/100 |
| 8,107,785 B2* | 1/2012 | Berglund | ............. | G02B 6/4441 174/481 |
| 8,111,966 B2* | 2/2012 | Holmberg | ............... | G02B 6/445 385/134 |

(Continued)

*Primary Examiner* — Ryan Lepisto
*Assistant Examiner* — Guy Anderson

(57) ABSTRACT

Drop cable assemblies suitable for an optical fiber distribution system are disclosed. For some embodiments, the drop cable assembly splits an input optical fiber to a plurality of optical fibers and provides optical connection to designated premises. For other embodiments, the drop cable assembly receives multi-fiber optical connection and provides the optical connections to designated premises.

22 Claims, 14 Drawing Sheets

(56) References Cited

U.S. PATENT DOCUMENTS

| | | | | |
|---|---|---|---|---|
| 8,162,546 B1* | 4/2012 | Mumm | ................ | G02B 6/4433 |
| | | | | 385/147 |
| 8,180,191 B2* | 5/2012 | Blackwell, Jr. | ...... | G02B 6/4441 |
| | | | | 385/134 |
| 8,221,006 B2* | 7/2012 | Theuerkorn | ......... | G02B 6/3887 |
| | | | | 385/53 |
| 8,267,596 B2* | 9/2012 | Theuerkorn | ......... | G02B 6/3887 |
| | | | | 385/114 |
| 8,837,894 B2* | 9/2014 | Holmberg | .............. | G02B 6/445 |
| | | | | 385/135 |
| 2006/0093278 A1* | 5/2006 | Elkins | .................. | G02B 6/4473 |
| | | | | 385/76 |
| 2006/0193575 A1* | 8/2006 | Greenwood | ......... | G02B 6/4495 |
| | | | | 385/109 |
| 2006/0193594 A1* | 8/2006 | Greenwood | ......... | G02B 6/4472 |
| | | | | 385/147 |
| 2007/0071392 A1* | 3/2007 | Baucom | ............... | G02B 6/4475 |
| | | | | 385/100 |
| 2007/0110384 A1* | 5/2007 | Cody | .................... | G02B 6/4475 |
| | | | | 385/134 |
| 2009/0238531 A1* | 9/2009 | Holmberg | .............. | G02B 6/445 |
| | | | | 385/135 |
| 2011/0097050 A1* | 4/2011 | Blackwell, Jr. | ...... | G02B 6/4441 |
| | | | | 385/135 |
| 2012/0189256 A1* | 7/2012 | Allen | ...................... | G02B 6/44 |
| | | | | 385/112 |
| 2013/0004126 A1* | 1/2013 | Wu | ...................... | G02B 6/4472 |
| | | | | 385/77 |
| 2013/0034333 A1* | 2/2013 | Holmberg | .............. | G02B 6/445 |
| | | | | 385/135 |
| 2013/0209051 A1* | 8/2013 | Wu | ...................... | G02B 6/4472 |
| | | | | 385/135 |

* cited by examiner

800

520   801

800

DROP CABLE ASSEMBLY

CROSS REFERENCE TO RELATED APPLICATIONS

This application claims the benefit of U.S. provisional patent application Ser. No. 62/024,582, filed 2014 Jul. 15, having the title "Outside Plant Cable Distribution System"; U.S. provisional patent application Ser. No. 62/026,847, filed 2014 Jul. 21, having the title "Outside Plant Cable Distribution System"; U.S. provisional patent application Ser. No. 62/041,249, filed 2014 Aug. 25, having the title "Duraline Future Path Aerial With Pulling Tape"; U.S. provisional patent application Ser. No. 62/043,016, filed 2014 Aug. 28, having the title "Duraline Future Path Aerial With Pulling Tape"; and U.S. provisional patent application Ser. No. 62/056,805, filed 2014 Sep. 29, having the title "Plug and Play FTTX Route", all of which are incorporated herein by reference in their entireties. In addition, this application is related to U.S. non-provisional patent application Ser. No. 14/625,711, filed 2015 Feb. 19, having the title "SYSTEMS AND METHOD FOR CABLE DISTRIBUTION"; and U.S. non-provisional patent application Ser. No. 14/633,191, filed 2015 Feb. 27, having the title "PLUG-AND-PLAY OPTICAL FIBER DISTRIBUTION SYSTEM."

BACKGROUND

Field of the Disclosure

The present disclosure relates generally to cable distribution and, more particularly, to fiber-optic cable distribution system.

Description of Related Art

Optical fiber-based systems are playing a larger role in data communications as customer demand for data capacity increases. For example, fiber-to-the-premises (FTTX) systems permit direct optical connections to the home or other premises, thereby providing greater access to data at the premises. Consequently, there are ongoing efforts to improve FTTX systems as customer demands for data continue to increase.

SUMMARY

The present disclosure provides drop cable assemblies for optical fiber distribution systems that offer fiber-optic connections to customer premises. For some embodiments, the drop cable assembly splits an input optical fiber to a plurality of optical fibers and provides optical connection to designated premises. For other embodiments, the drop cable assembly receives multi-fiber optical connection and provides the optical connections to designated premises. Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Fiber-optic networks are playing a larger role in data communications as customer demand for data capacity increases. Lately, there have been increasing demands for fiber-to-the-premises (FTTX) systems, which permit direct optical connections to the home or other premises.

Figure 1:
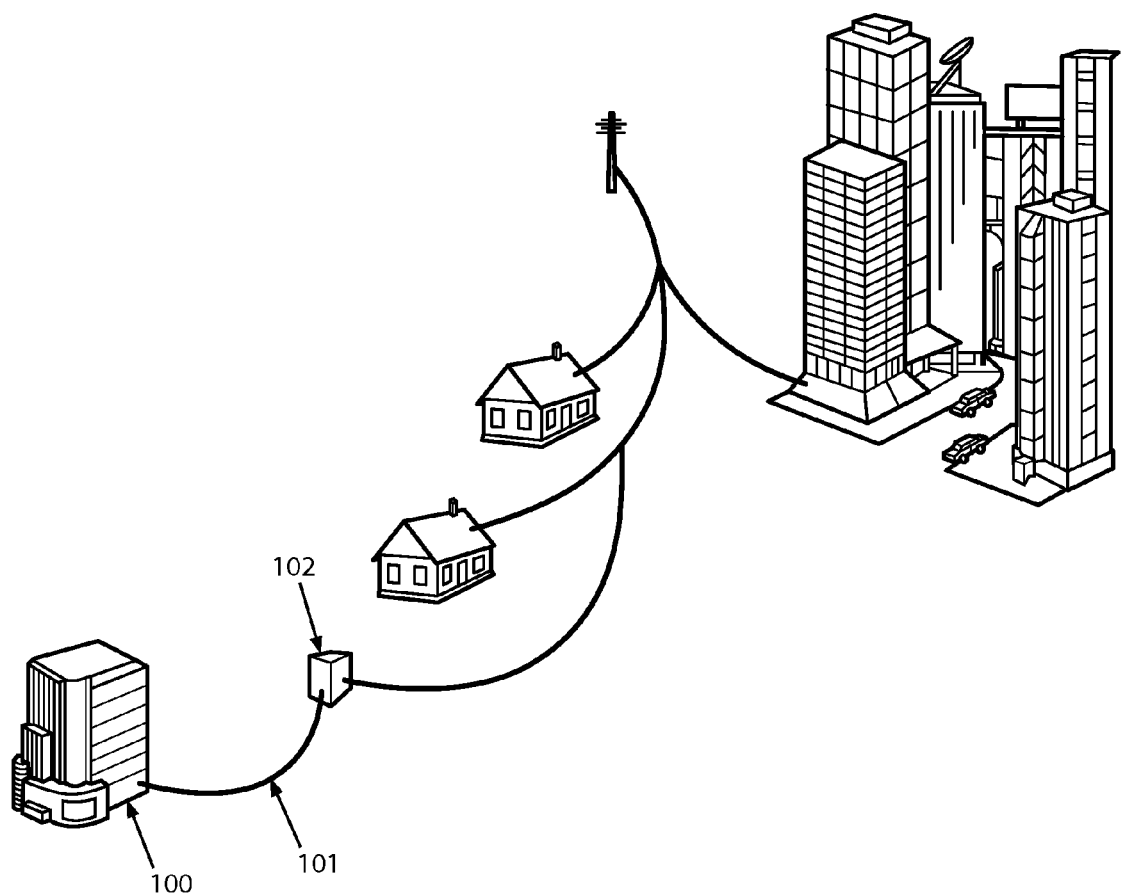
FIG. 1 is a diagram showing a typical fiber-to-the-premises (FTTX) optical fiber distribution system.

FIG. 1 illustrates a typical FTTX optical fiber distribution system of an optical fiber network. Such network generally utilizes electronics and lasers located in the Central Office (CO) 100 to provide service to multiple customers over one or more optical fibers. A feeder cable 101 extending from the CO 100 has at least one optical fiber. The feeder cable 101 leaving the CO 100 is routed to a splitter cabinet 102 at a geographically convenient location. Typically, the location is near the customer service area. However, because the splitter cabinet 102 is bulky and takes large space, such geographically convenient locations are very limited, and therefore, the splitter cabinet 102 is usually placed near the entrance of a subdivision or in the basement of a commercial building or multi-dwelling units. Because placement choices of the splitter cabinet 102 are limited, an accurate measurement of the distance between the splitter cabinet 102 and the CO 100 is often required.

The optical signal reaching the splitter cabinet 102 is often subsequently routed through an optical splitter (not shown) within the splitter cabinet 102. The optical splitter splits input signal carried by one fiber into "n" output signals carried by "n" fibers. Splitters are typically referred to as 1×n where "n" represents the number of output optical fibers or "ports" that come out from the optical splitter. Each output port of the splitter may be terminated with a connector and can provide full service to a subscriber (i.e. a customer or a potential customer who has signed up for service from a provider). A typical splitter cabinet is capable of serving anything from 144 to 576 premises. However, such splitter cabinets are expensive and require a large space to accommodate and to manage connection points for the premises they serve. Also, because each input optical fiber of a splitter is typically spliced, a high skilled technician is required to make necessary splicing at the splitter cabinet. Such demand results in significant labor during the deployment of a fiber-optic network.

Various embodiments address these and other shortcomings associated with a conventional optical fiber distribution system by providing plug-and-play optical fiber distribution systems having a cable combiner and a splitter housing. Because all optical fibers are connectorized for plug-and-play and because the functionality of a traditional splitter cabinet is replaced by much smaller and cheaper units of cable combiner and splitter housing, a faster, more flexible and more affordable FTTX deployment is possible. In other words, unlike traditional FTTX deployment processes that require labor intense and costly splitter cabinets, the disclosed embodiments provide a plug-and-play FTTX deployment system that requires no splitter cabinet. Having provided a general description of the disclosure, a detailed description of the innovation is discussed in the narrative of the invention embodiments as illustrated in the drawings that follow. While several embodiments are described in connection with these drawings, there is no intent to limit the disclosure to the embodiment or embodiments disclosed herein. On the contrary, the intent is to cover all alternatives, modifications, and equivalents.

Figure 2:
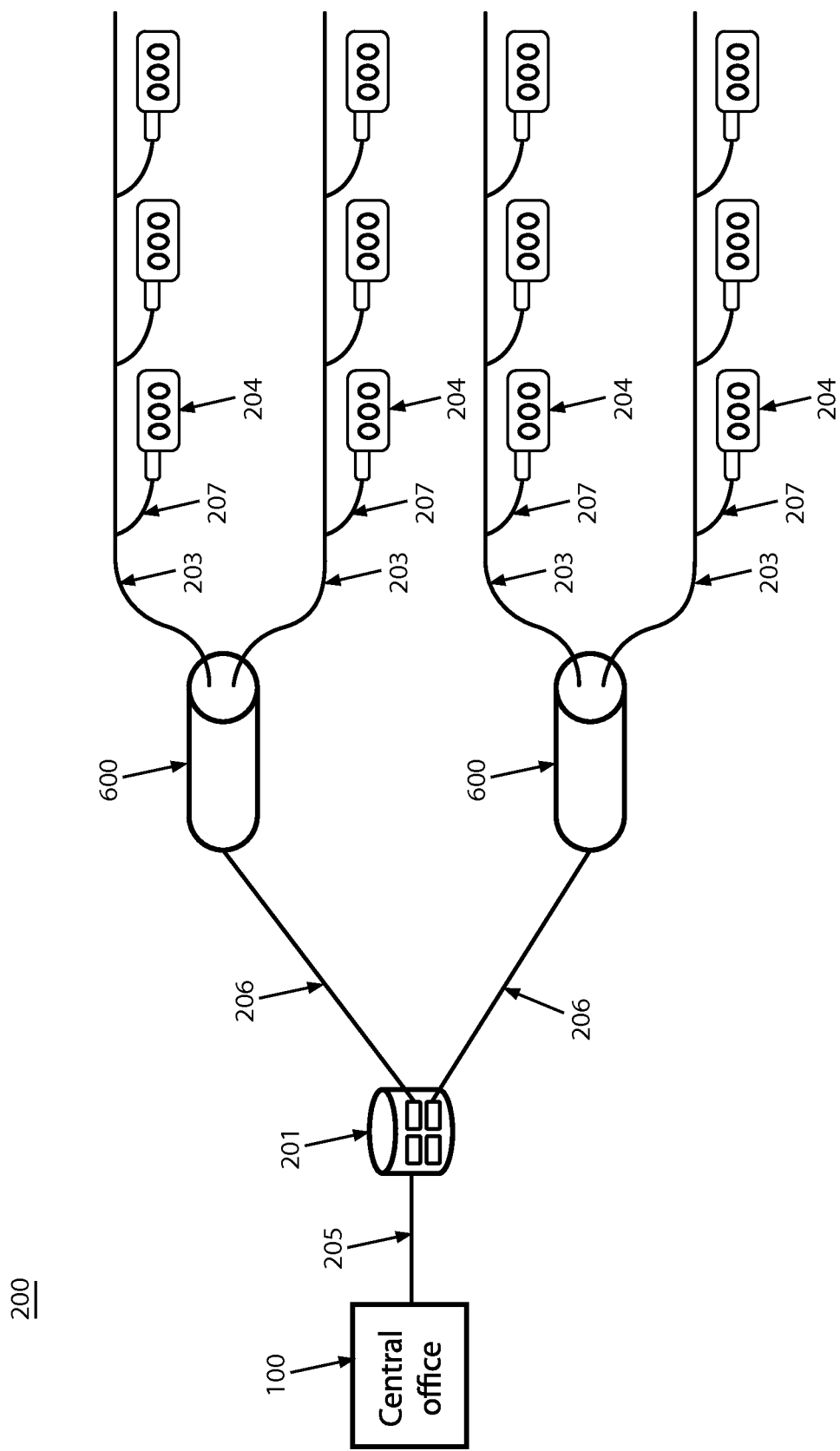
FIG. 2 is a diagram showing one embodiment of an invented optical fiber distribution system, which has a cable combiner and two splitter housings.

FIG. 2 is a diagram showing one embodiment of an invented optical fiber distribution system 200. The optical fiber distribution system 200 comprises a CO 100, a feeder cable 205 extending from the CO 100, a cable combiner 201 that terminates the feeder cable 205, two extension cables 206 optically connected to the cable combiner 201, two splitter housings 600 that terminate the extension cable 206 and splits each input optical fiber into a plurality of output optical fibers, distribution cables 203 optically connected to at least one of the output optical fibers, and a plurality of terminals 204 optically connected to the distribution cable 203 through tether cables 207. The terminals 204 are configured to act as customer optical fiber connection access points once a customer subscribes to an optical fiber network provider.

To provide an internet connection to customer's premises, the terminal 204 is connected to a drop cable through a connector assembly (not shown). The connector assembly can include many different types of connectors, such as, for example, multi-fiber MPO types connectors, SC and LC single-fiber connectors, in line adapters of different types and other known fiber-optic connectors (e.g., conventional connectors used in drop cable assemblies). If the connector assembly is exposed to an outside environment, the connector assembly should be outside plant (OSP) rated. In this specification, optical components (e.g. closures, connector ports, cables etc. . . . ) are said to be "outside plant (OSP) rated" when they protect inner components from an outside environment (e.g. moisture, ultraviolet (UV) radiation, pests and vermin, etc.).

Furthermore, the optical fiber distribution system 200 is a plug-and-play system. It means that the optical fiber distribution system 200 is deployed without any splicing in the field. It also means that the cable combiner 201 and the splitter housings 600 are factory manufactured. Therefore, there is no need for a high skilled technician to splice fibers in the field, which is typically required for a conventional FTTX deployment using splitter cabinets. Eliminating the need for hiring high skilled technicians to perform a field work results in a significant labor cost saving of the FTTX network deployment. Another advantage of the optical fiber distribution system 200 is a set of cable combiner 201 and splitter housing 600 that replace the functionality of a traditional splitter cabinet. Because both cable combiner 201 and splitter housing 600 are OSP rated and substantially smaller than a traditional splitter cabinet, the cable combiner 201 and the splitter housing 600 can be placed effectively anywhere independent of each other, instead of a fixed predetermined location. Furthermore, both cable combiner 201 and splitter housing 600 are small, light and durable enough to be used for both aerial and buried deployments. Such features of the cable combiner 201 and splitter housing 600 provide flexibility in a FTTX deployment.

Figure 3:
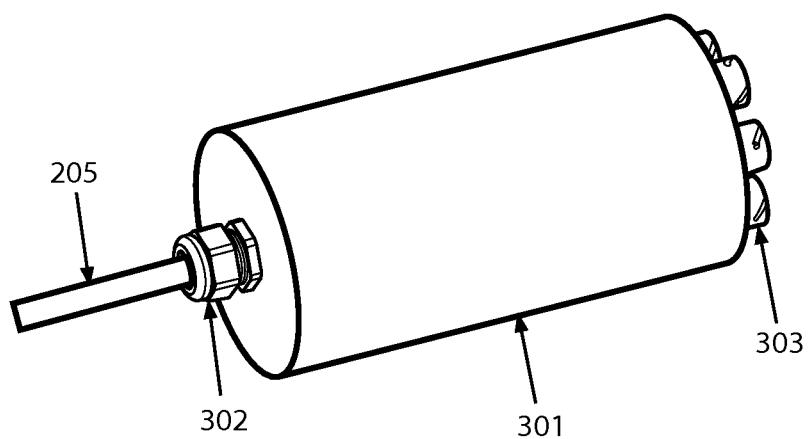
FIG. 3 is a diagram showing one embodiment of the cable combiner.

With this FTTX environment in mind, attention is turned to FIG. 3, which shows one embodiment of a cable combiner 201. The combiner cable assembly 201 comprises a closure 301 having a cable port 302 and a plurality of connector ports 303. The cable port 302 receives the feeder cable 205 extending from a central office and takes the feeder cable 205 inside of the closure 301. The number of optical fibers in the feeder cable 205 may vary depending on a scale of an FTTX deployment. For example, feeder cables having 144 optical fibers are typical used to serve a few thousands premises.

The cable combiner 201 is OSP rated such that the optical fibers inside the feeder cable 205 are protected from an outside environment when the fibers are divided into sub-units and terminated by the connector ports 303 within the closure 301. Quantity of optical fibers inside the feeder cable 205, quantity of sub-units, and quantity of optical fibers per sub-unit may vary depend on the scale of an FTTX deployment and other factors. For example, 144 fibers in a feeder cable can be divided into 18 sub-units of 8 fibers each. If sub-units contain plurality of optical fibers, then the connector ports 303 are configured to receive a multi-fiber connection. Furthermore, if the connector ports 303 are on the exterior surface of the closure 301 as shown in FIG. 3, then the connector ports 303 should be OSP rated. However, the connector ports 303 may be placed inside of the closure 301 and the connector ports 303 may not be OSP rated. Finally, the feeder cable 205 is preferably integrated with the cable combiner 201 and pre-fabricated in a factory. For example, the feeder cable 205 may be spliced directly to the connector ports 303. Alternatively, the sub-units of the feeder cable 205 may be pre-connectorized in a factory, and assembled with the cable combiner 201 in the factory or in the field.

The cable combiner 201 also acts as an aggregation point of a plurality of extension cables. Referring back to FIG. 2, extension cables 206 are optically connected to corresponding sub-unites of the feeder cable 205 at one of the connector ports of the cable combiner 201. The extension cable 206 is connectorized and terminated at the connector port of the cable combiner 201. Preferably, the connectorized ends of the extending cables 206 and the cables themselves are OSP rated.

Figure 4:
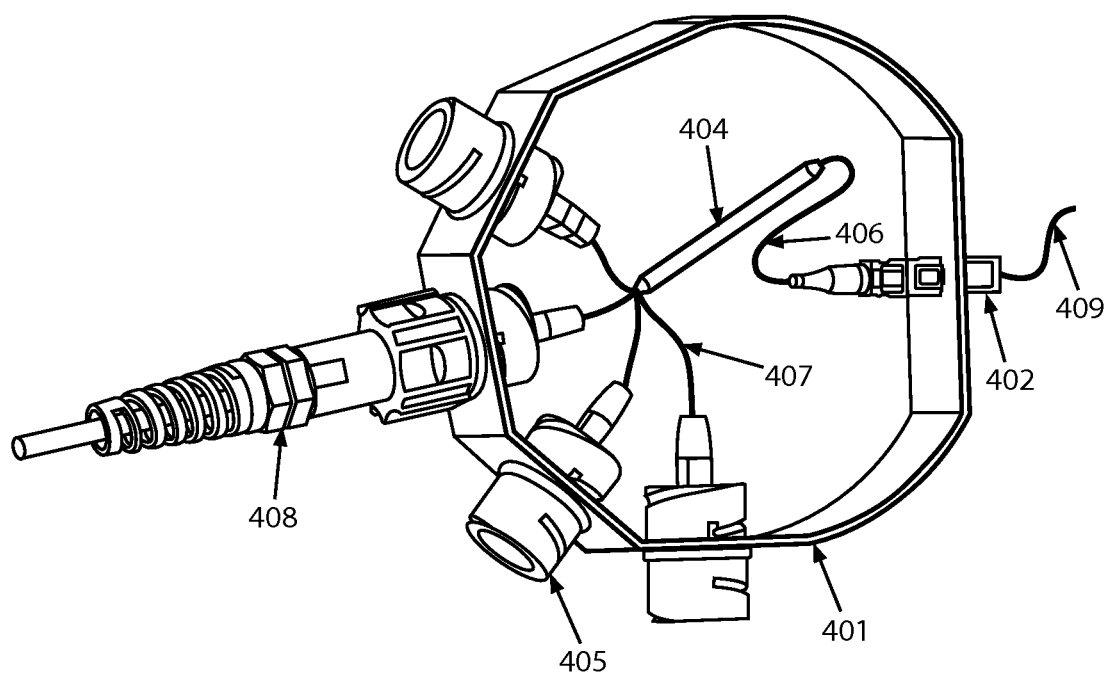
FIG. 4 is a diagram showing one embodiment of the splitter module without a cover.

Next, FIG. 4 shows one embodiment of a splitter module 202 without a cover. A plurality of the splitter modules 202 are incorporated into the splitter housing 600 shown in FIG. 2. The splitter module 202 is OSP rated such that the optical fibers and other components inside the closure 401 are protected. The splitter module 202 splits one input optical fiber into a plurality of output optical fibers to serve multiple premises using a single optical fiber. The splitter module 202 comprises a closure 401 having a connection port 402, a splitter 404 and a plurality of connector ports 405.

The connection port 402 receives an optical fiber connection 409 extending from an extension cable 206 shown in FIG. 2. Preferably, the connection port 402 is a connector port that configured to receive a connectorized end of the optical fiber connection 409.

Inside the closure 401, the splitter 404 is optically connected to an input optical fiber 406 extending from the optical fiber connection 409 and splits the input optical fiber 406 into a plurality of output optical fibers 407. Preferably, the input optical fiber 406 is connectorized and optically connected to the optical fiber connection 409 at the connector port 402. The splitter 404 is any suitable optical device that allows a single optical fiber network interface to be shared among many subscribers. Such optical device converts each input optical fiber into "n" number of output optical fibers. Preferably, the splitter 404 splits one input optical fiber into 32 output optical fibers. Furthermore, the splitter 404 preferably is a planer light circuit (PLC). Number of ways the signal is split and the method of split may vary depend on a scale of a FTTX deployment and other factors.

The plurality of output optical fibers 407 are terminated by the connector ports 405, and the output optical fibers 407 are optically connected to the connectorized ends 408 of the distribution cables in the field. Preferably the output optical fibers 407 are connectorized and configured to be mated with the connectorized end 408 of the distribution cable. If output optical fibers are grouped into sub-units before termination (like ribbonized fiber or other groupings), then the connector ports 405 are configured to receive a multi-fiber connection. Furthermore, if the connector ports 405 are on the exterior surface of the closure 401 as shown in FIG. 4, then the connector ports 405 should be OSP rated. However, the connector ports 405 may be placed inside of the closure 401 and the connector ports 405 may not be OSP rated.

Finally, the splitter module 202 is pre-fabricated in a factory. For example, the optical components of the splitter module 404 are spliced and assembled in a factory. Alternatively, the optical components of the splitter module 404 may be pre-connectorized in a factory, and assembled in the factory or in the field.

Figure 5A:
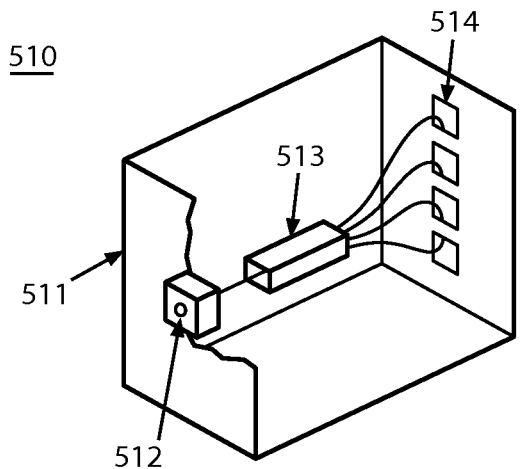
FIG. 5a-c are diagrams showing another embodiments of the splitter module.
Figure 5B:
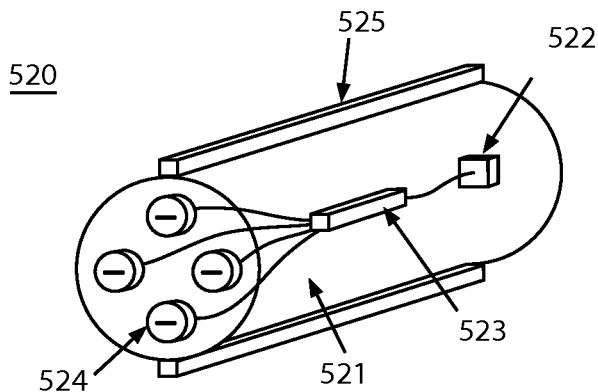
Figure 5C:
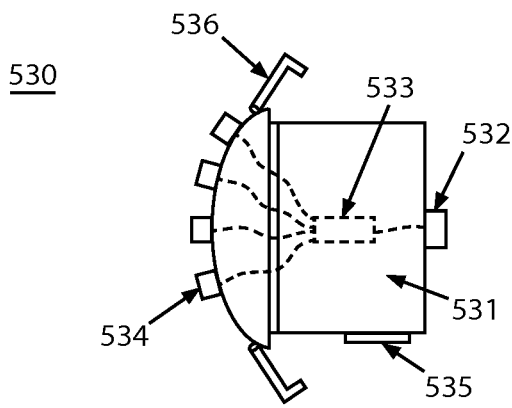

Furthermore, the splitter module can take different shapes. FIG. 5a-c are the diagrams showing another embodiments of a splitter module. FIG. 5a shows a partial cut-out view of a rectangular-shaped splitter module 510. A connection port 512 is located at on the first surface of the closure 511, the splitter 513 is located inside the closure 511 and the connector ports 514 are located on the second surface of the closure 711 opposite to the first surface.

FIG. 5b shows a round-shaped splitter housing 520. A connection port 522 is located on the first surface of the closure 521, a splitter 523 is located inside the closure 521 and the connector ports 524 are located on the opposite wall of the closure 521. Furthermore, the round-shaped splitter housing 520 has an alignment device 525 on the exterior surface of the closure 521, which can be used to align it inside a larger system with other splitter modules or another device with a similar alignment device.

FIG. 5c shows a splitter module with integrated latch system 530. A connection port 532 is allocated on the first surface of a closure 531, a splitter 533 is located inside the closure 531 and the connector ports 534 are located on the second and opposed surface of the closure 531. Furthermore, the splitter module 530 has an alignment device 535 on the exterior surface of the closure 531, which can be used to align it in a larger system with other splitter modules or another device with a similar alignment device. An integrated latch system 536 of the splitter module 530 allows quick incorporation and removal of the splitter module from a splitter housing. The embodiments shown in FIG. 5a-c are mere example of different embodiments of splitter modules; other shapes of splitter modules are also within the scope of the present invention. Preferably, any of the embodiments shown in FIG. 5a-c are OSP rated.

Figure 6:
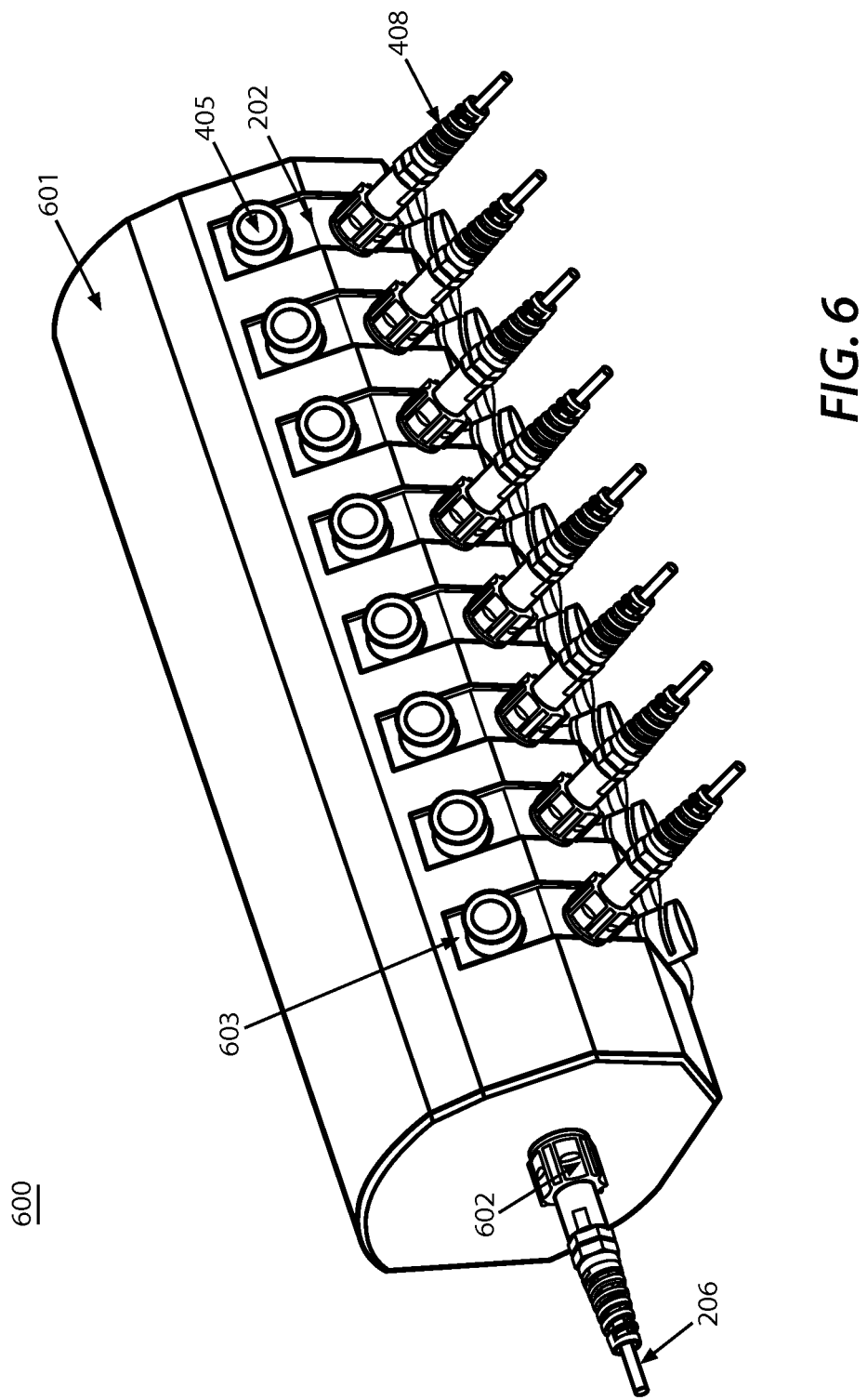
FIG. 6 is a diagram showing one embodiment of a splitter housing.

To use the splitter modules in an optical fiber distribution system, a plurality of splitter modules are grouped together and incorporated into a larger splitter housing. FIG. 6 shows one embodiment of such splitter housing 600. In particular, FIG. 6 shows one embodiment of a splitter housing 600 that stacks a plurality of splitter modules 202 side by side. As shown in the embodiment of FIG. 6, the splitter housing 600 comprise a container 601, a cable port 602 that receives an extension cable 206 extending from one of the connector ports of the cable combiner, and openings 603. Preferably, the splitter housing 600 is OSP rated, at least when the splitter modules 202 are installed.

In FIG. 6, the cable port 602 is a connector port that is configured to receive a multi-fiber connector. Preferably, the connector port is configured to receive a multiple of optical fiber connections conforming to the number of splitter modules 202 inside the container 601. For example, the splitter housing 600 is designed to hold eight splitter modules 202. Therefore, the connector port at the cable port 602 should be designed to receive eight optical fiber connections to serve the eight splitter modules 202 inside the container 601. Inside the closure 601, a plurality of optical fiber connections (shown as 409 in FIG. 4) are extended from the cable port 602. Although not shown in FIG. 6, one can appreciate that the extension cable 206 may be terminated by a plurality of single fiber connectors configured to be connected to the connection port of the splitter modules 202 inside the container 601 through the cable port 602 of the splitter housing 600. In this configuration, a connector port at the extending cable port 602 can be eliminated and replaced by a simple pass through opening.

The container 601 has a sufficient space inside to accommodate desired number of splitter modules 202 and to accommodate and manage optical fibers necessary to optically connect the optical fibers inside the extension cable 206 to corresponding splitter modules 202. Furthermore, the openings 603 provide sufficient space to expose the connector ports 405 of the splitter modules 202. Although not shown in FIG. 6, one can appreciate that the openings 603 may be much smaller than what was shown in FIG. 6. The size of the opening is adequate if a sufficient portion of connector ports 405 are exposed to the exterior of the splitter housing 600 to make a connection with corresponding connectors 408. The connector ports 405 are configured to be connected to a mating connector 408 of a distribution cable.

Because the splitter housing 600 splits input optical fibers to many output optical fibers, the splitter housing 600 can act as a pivot point to design a well-organized FTTX deployment scheme. Referring back to FIG. 2, distribution cables 203 are optically connected to corresponding sub-unites of the output optical fibers at one of the connector ports of the splitter module 202. The distribution cable 203 is connectorized and terminated at the connector port of the splitter module 202. Preferably, the connectorized ends 408 of the distribution cables 203 and the cables themselves are OSP rated. The splitter housing 600 is a small, modular and functionally stand-alone sub-unit of a conventional splitter cabinet; therefore, the proposed FTTX deployment is much more flexible than the conventional deployment using a bulky splitter cabinet. Such flexibility in deployment may allow off-the-shelf optical fiber cables to be used as feeder cables and extension cables.

Figure 7A:
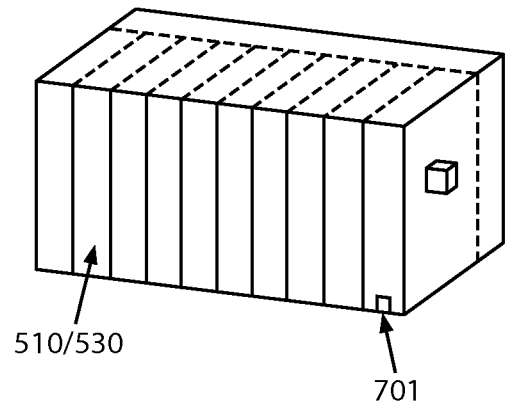
FIG. 7 a-b are diagrams showing another embodiment of the splitter housing.
Figure 7B:
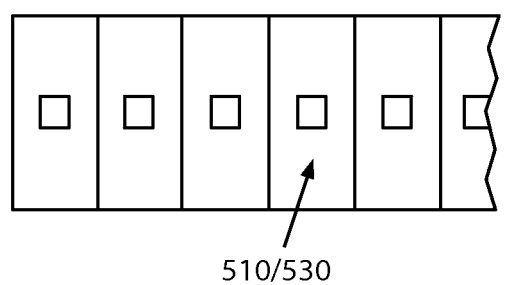

Furthermore, the shape and size of the splitter housing can be different depending on the shape of the splitter module and number of splitter modules to be incorporated into the splitter housing. For example, FIGS. 7a-b show another embodiment of a splitter housing 700 that accommodates a plurality of rectangular-shaped splitter modules like the ones shown in FIGS. 5a and 5c. FIG. 7a shows a perspective view of the splitter housing 700, which accommodates a plurality of splitter modules 510 or 530 (shown in FIG. 7a as 510/530). Preferably, the structure 700 has a mechanism 701 that accepts an optional alignment device of the splitter modules 510 or 530. Furthermore, the splitter housing 700 may have a latching mechanism (not shown) compatible with the optional latching mechanism of the splitter modules 510 or 530. FIG. 7b shows a plain view of one surface of the splitter housing 700. The surface represents the backplane of the splitter housing 700 and the connection port side of the splitter modules 510 or 530.

Figure 8A:
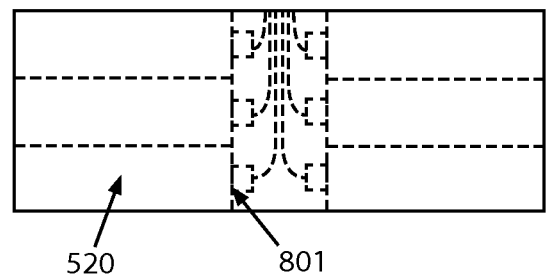
FIG. 8 a-b are diagrams showing yet another embodiment of the splitter housing.
Figure 8B:
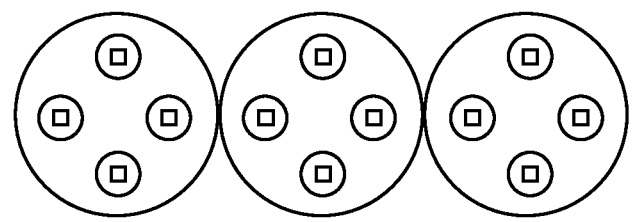

Next, FIGS. 8a-b show a yet another embodiment of a splitter housing 800 that accommodates a plurality of round-shaped splitter housings like the ones shown in FIG. 5b. FIG. 8a-b show a splitter housing 800 that accommodates such splitter modules 520. FIG. 8a shows a top view of the splitter housing 800, which accommodates a plurality of round-shaped splitter modules 520. The connection port side 801 of the splitter modules 520 is placed inside of the splitter housing 800. FIG. 8b shows a plan view of one side of the splitter housing 800 that exposes connection ports of splitter modules 520. Preferably, the splitter housing 800 has a mechanism (not shown) allowing its alignment inside of the splitter modules 520. Furthermore, the splitter housing 700 may have a latching mechanism (not shown) to correspond with an optional latching mechanism of the splitter modules 520.

Referring back to FIG. 2, the distribution cables 203 are optically connected to connector ports of the splitter module 202 in order to provide a mid-span access to the fibers inside the distribution cable 203 through tether cables 207. The end of a tether cable 207 may be connectorized to mate with a corresponding connector port or ports of the terminal 204. Alternatively, the distribution cable 203 is prefabricated and integrated with appropriate number of terminals 204 in a factory. The terminals 204 serve as a customer optical fiber connection access points. Once a customer subscribes to an optical fiber network provider, a drop cable from the customer's premise will be optically connected with an appropriate port of the terminal 204.

Figure 9:
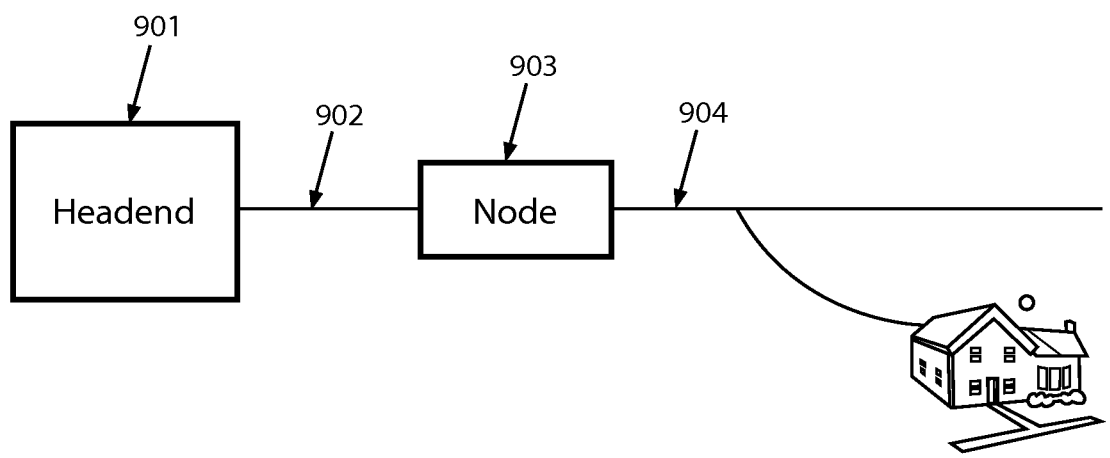
FIG. 9 is a diagram showing a typical cable TV distribution system for transmitting cable TV signals.

Similarly, a cable TV distribution system may utilize a similar structure to transmit cable TV signals to subscribed customers. FIG. 9 shows a typical cable TV distribution system 900 for transmitting cable TV signals. As shown in FIG. 9, the cable TV distribution system 900 comprises a headend 901, a feeder cable 902, a node 903 and a copper-based distribution cable 904. Usually, a network between the headend 901 and the node 903 is fiber-optic-based network and the feeder cable 902 typically contains 4 to 12 optical fibers inside the cable.

The node 903 converts the downstream optically modulated signal coming from the headend 901 to an electrical signal and the signal travels to the subscribed customers through the copper-based distribution cable 904. Typically, downstream signal is an RF modulated signal that begins at 50 MHz and ranges from 550-1000 MHz on the upper end. The node 903 also can send communication from the subscribed customers back to the headend 901. Typically, the reverse signal is a modulated RF ranging from 5-65 MHz.

However, because of the increasing demand for a high bandwidth for TV signals especially for high definition (HD) programs, the existing copper based network is becoming the bottleneck of existing cable TV distribution system. The existing copper based network may not be able to allocate sufficient amount of bandwidth for each subscribed customers per node. Also, adding a new node requires a power source to the node, which adds cost and complexity to the new construction of nodes, and for some locations, adding a new node may not be technically possible.

Figure 10:
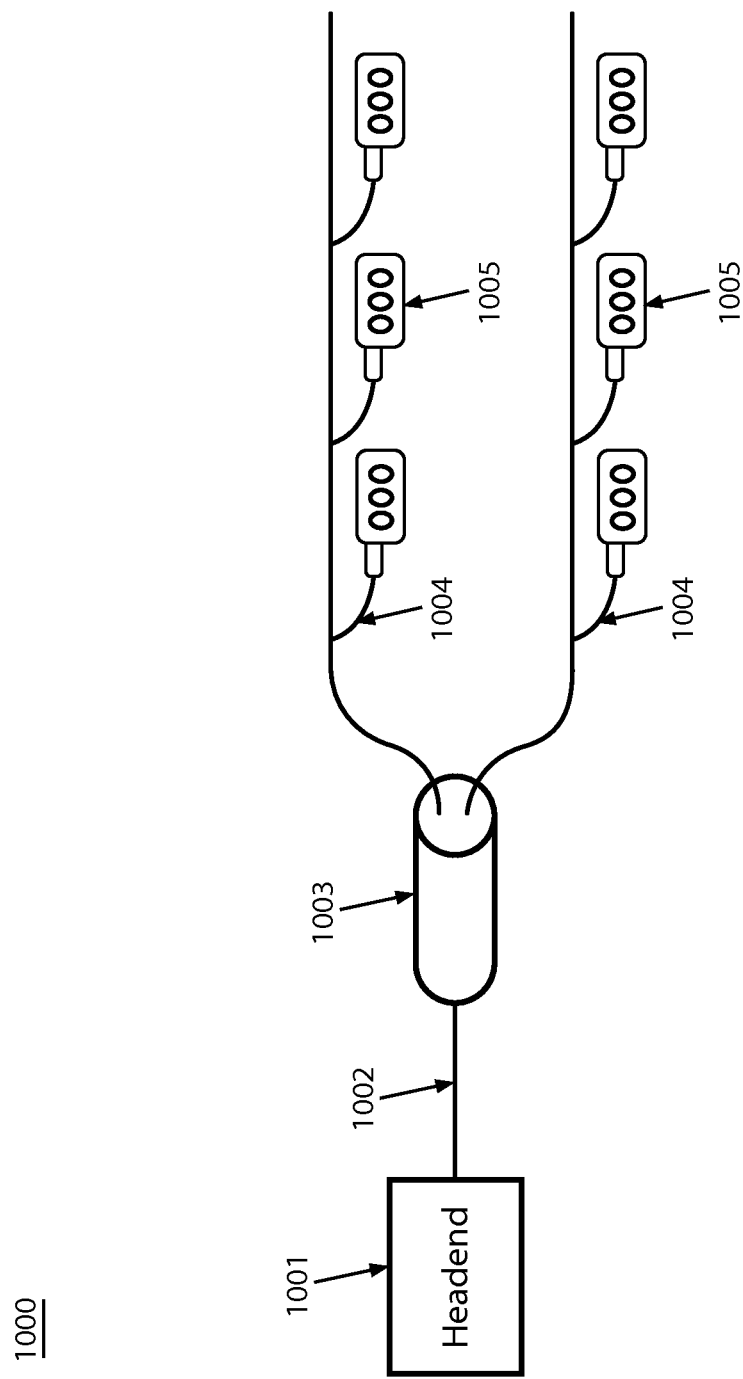
FIG. 10 is a diagram showing one embodiment of an invented cable TV distribution system, which is substantially free from copper cables.

Instead of having a mixed fiber-optic/copper-based distribution system, cable TV distribution systems can utilize all fiber plug-and-play structures disclosed above. FIG. 10 shows one embodiment of an invented cable TV distribution system 1000, which is substantially free from copper cables. As shown in FIG. 10, the cable TV distribution system 1000, for transmitting cable TV signals to subscribed customers, comprises a headend 1001 for providing cable TV signals, a feeder cable 1002 extending from the headend 1001, the feeder cable 1002 has at least one optical fiber, an OSP rated splitter housing 1003 optically connected to the feeder cable 1002, and an optical fiber-based distribution cables 1004 optically connected to the splitter housing 1003.

The splitter housing 1003 has a plurality of splitter modules. Each splitter module has a closure having a connection port, a splitter, and a plurality of connector ports. The feeder cable 1002 is received by a cable port of the splitter module. The optical fibers inside the feeder cable 1002 are optically connected to corresponding splitter modules through optical fiber connections between the cable port of the splitter housing 1003 and the connection port of the splitter module. Inside the splitter module, the splitter splits an input optical fiber extending from the connection port into a plurality of output optical fibers. Then, the connector ports terminate the output optical fibers.

The optical fiber-based distribution cables 1004 are optically connected to at least one of the output optical fibers at one of the connector ports of the splitter module. Furthermore, a plurality of terminals 1005 are optically connected to the distribution cable 1004. The terminals 1005 are configured to act as a customer cable TV connection access point once a customer subscribes to a cable TV provider. Preferably, the splitter modules are factory manufactured and the cable TV distribution system 1000 is deployed without any splicing in the field.

The cable TV distribution system 1000 is substantially free from copper-based cables all the way from the headend 1001 to the customer cable TV connection access points. Because the cable TV distribution system 1000 is copper cable free, there is no node that convers optical signals to electric signals, which means that the cable TV distribution system 1000 can be deployed without any power source between the headend 1001 and the terminals 1005. Also, because the splitter housing 1003 can be designed to fit in a space for a node used in a traditional copper-based cable TV distribution system, the cable TV distribution system 1000 can be deployed using the existing cable TV distribution system by replacing the nodes and copper-based distribution cables. Furthermore, the deployment of the cable TV distribution system 1000 is much quicker than conventional copper-based distribution because the cable TV distribution system 1000 is plug-and-play and there is no need to fusion-splice any portion of the optical fibers throughout the network.

Figure 11:
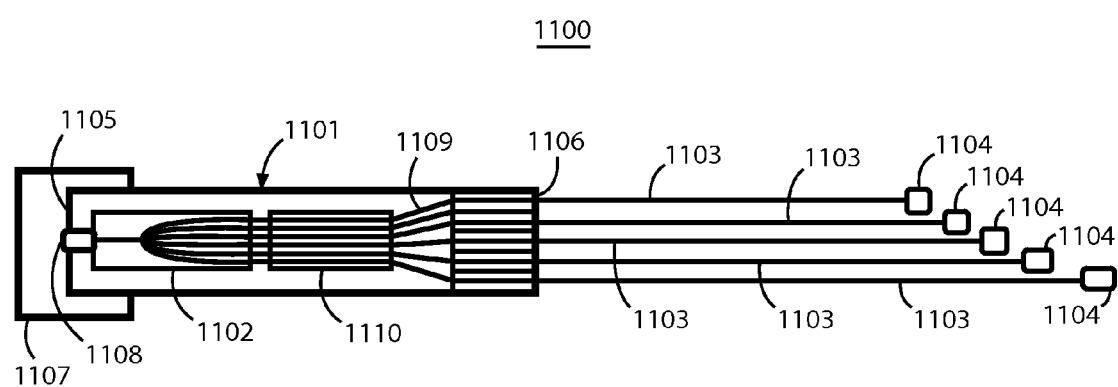
FIG. 11 is a diagram showing one embodiment of a drop cable assembly.
Figure 12:
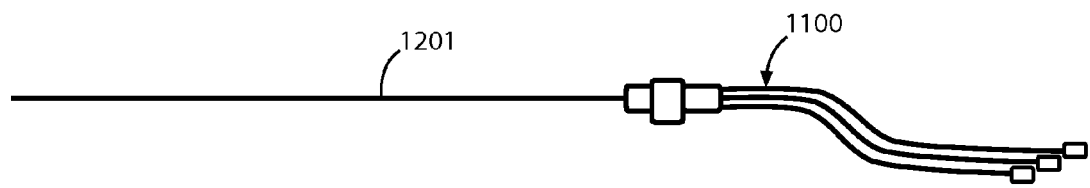
FIG. 12 is a diagram showing one application of the drop cable assembly show in FIG. 11.
Figure 13:
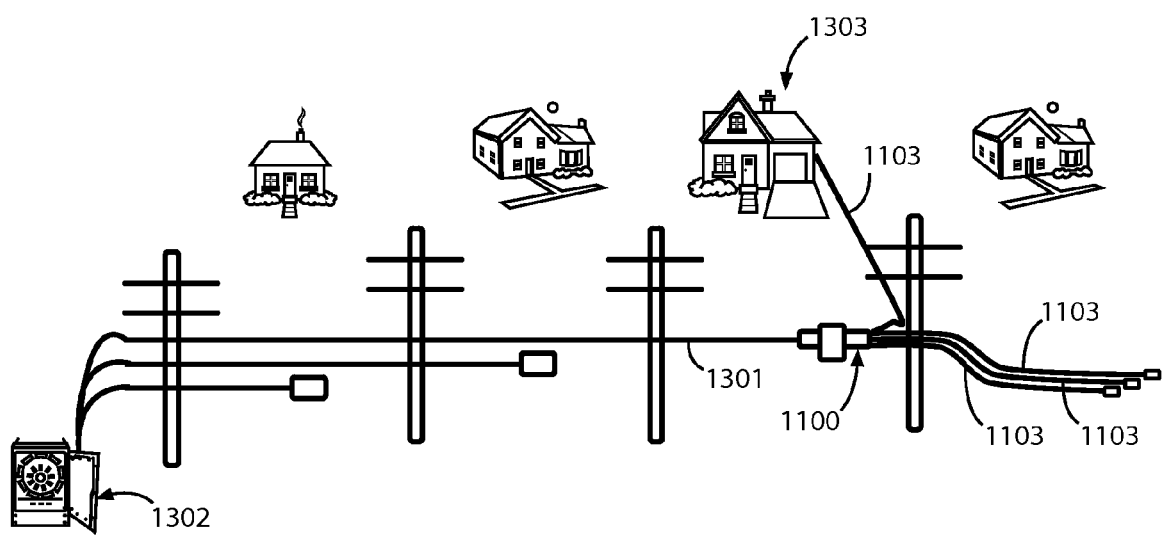
FIG. 13 is a diagram showing another application of the drop cable assembly show in FIG. 11.

The optical fiber distribution systems disclosed above and/or existing FTTX systems may employ a drop cable assembly 1100 shown in FIG. 11 as a part of the fiber-optic network. For example, as shown in FIG. 12, the drop cable assembly 1100 may be optically connected to a tether cable 1201. Alternatively, as shown in FIG. 13, the drop cable assembly 1100 may be optically connected to a distribution cable or other optical fiber cable 1301 that extends directly from a splitter cabinet 1302. The drop cable assembly 1100 has a plurality of furcation legs 1103 that provide optical connections to designated premises 1303. Each designated premise 1303 has an optical network connection terminal (not shown) to receive the optical connection from the drop cable assembly.

Referring back to FIG. 11, the details of the drop cable assembly 1100 are explained. The drop cable assembly 1100 comprises a closure 1101, a splitter 1102, a plurality of furcation legs 1103, and optical connector ports 1104. Preferably, the drop cable assembly 1100 is outside plant (OSP) rated.

The closure 1101 has a first end 1105 adapted to be attached to an optical fiber cable and a second end 1106. The closure 1101 contains an input optical fiber (not shown) optically connected to a corresponding optical fiber in the optical fiber cable. Preferably, the first end 1105 of the closure 1101 includes a receptacle with a coupling nut 1107 and a single fiber ferrule 1108 for receiving a connectorized optical fiber cable, therefore the drop cable assembly can be used as a part of a plug-and-play optical fiber distribution system.

The input optical fiber (not shown) within the closure 1101 is optically connected to the splitter 1102. The splitter 1102 splits the input optical fiber into a plurality of output fibers 1109. Preferably the splitter 1102 splits the input optical fiber into "n" number of output optical fibers. Preferably, the splitter 1102 splits one input optical fiber into 4, 8, 12, 16, 20 or 24 output optical fibers. Furthermore, the splitter 1102 preferably is a planar light circuit (PLC).

The output optical fibers 1109 are separated and transitioned into at least one furcation leg 1103 at a furcation at the second end 1106 of the closure 1101. Each furcation leg 1103 has a first end attached to the furcation, a second end terminated by the optical connection port 1104, and a pre-determined length to reach a designated premise. The pre-determined lengths of furcation legs 1103 are uniquely engineered based on the distance between the closure 1101 and the designated premise to be served by the specified furcation leg. For example, the pre-determined length of each furcation leg 1103 is calculated based on a field survey that is conducted before the deployment of an FTTX system. Preferably, the pre-determined length of each furcation leg 1103 is up to 10% longer than the actual distance between the closure 1101 of the drop cable assembly 1100 and the designated premise.

The furcation leg 1103 that contains the output optical fiber 1109 is terminated by the optical connection port 1104 at the second end of the furcation leg 1103. The optical connection port 1104 mates the output optical fiber 1109 with a corresponding optical fiber within the designated premise and optically connects those two fibers together. An optical network connection terminal located in the designated premise receives the specified optical connection port 1104 of the drop cable assembly 1100 to mate with and optically connect to the corresponding optical fiber within the designated premise. In one embodiment, the optical connection port 1104 at the second end of the furcation leg 1103 is a receptacle for receiving a connectorized optical fiber cable that contains the corresponding optical fiber within the designated premise. Alternatively, the optical connection port 1104 at the second end of the furcation leg 1103 is an optical fiber connector for mating with a receptacle of an optical fiber cable that contains the corresponding optical fiber within the designated premise. In preferred embodiments, each optical connection port 1104 may include an adapter or connector alignment sleeve for aligning the optical fibers of the opposing connectors.

To expedite the deployment of an FTTX system and to reduce the cost, the drop cable assembly 1100 may be pre-fabricated for example in a factory. Furthermore, preferably, the furcation legs 1103 with at least one output optical fiber 1109 are spliced to the splitter 1102 for the ease of manufacturing such a drop cable assembly in a factory. If the output optical fibers 1109 are spliced to the splitter 1102, then a splice tray 1110 within the closure 1101 accommodates splice points between the splitter 1102 and the output optical fibers 1109.

Figure 14:
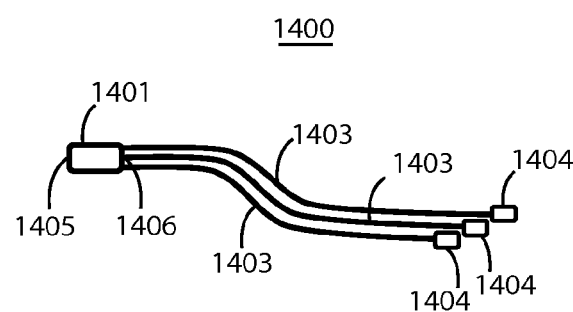
FIG. 14 is a diagram showing another embodiment of a drop cable assembly.
Figure 15:
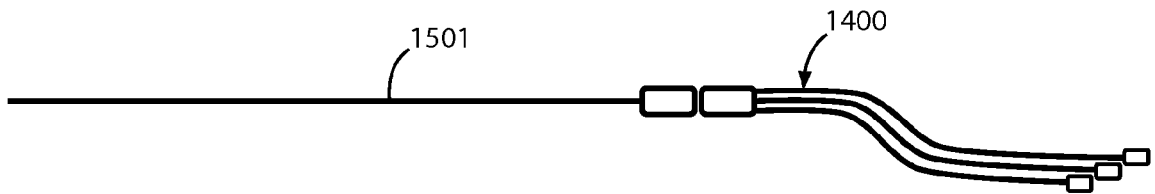
FIG. 15 is a diagram showing one application of the drop cable assembly show in FIG. 14.
Figure 16:
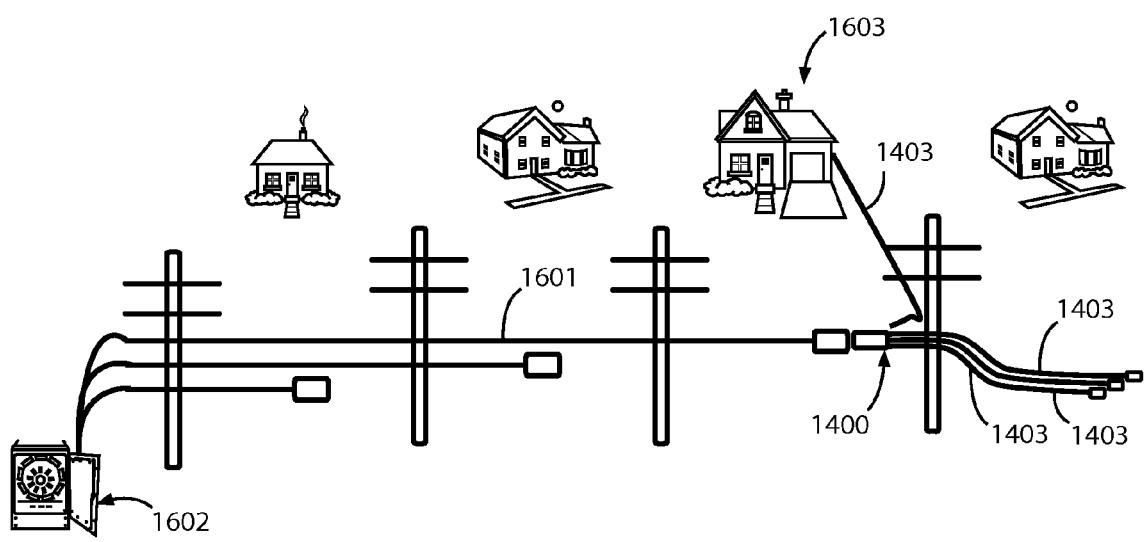
FIG. 16 is a diagram showing another application of the drop cable assembly show in FIG. 14.

Another embodiment of a drop cable assembly is a multi-fiber drop cable assembly as shown in FIG. 14. For example, as shown in FIG. 15, the multi-fiber drop cable assembly 1400 may be optically connected to a tether cable 1501. Alternatively, as shown in FIG. 16, the multi-fiber drop cable assembly 1400 may be optically connected to a distribution cable or other optical fiber cable 1601 that extends directly from a splitter cabinet 1602. The multi-fiber drop cable assembly 1400 has a plurality of furcation legs 1403 that provide optical connections to designated premises 1603. Each designated premise 1603 has an optical network connection terminal (not shown) to receive the optical connection from the drop cable assembly.

Referring back to FIG. 14, the details of the multi-fiber drop cable assembly 1400 are explained. The drop cable assembly 1400 comprises a closure 1401, a plurality of furcation legs 1403, and optical connector ports 1404. Preferably, the drop cable assembly 1400 is outside plant (OSP) rated.

The closure 1401 has a first end 1405 adapted to be attached to an optical fiber cable and a second end 1406. The closure 1401 contains a plurality of optical fibers (not shown) optically connected to a corresponding plurality of optical fibers in the optical fiber cable. Preferably, the optical fiber cable, where the multi-fiber drop cable assembly 1400 is adapted to be attached to, is terminated by a multi-fiber connector; and the first end 1405 of the closure 1401 comprises a receptacle for receiving the multi-fiber connector. Any suitable multi-fiber connectors and corresponding receptacles may be used. For example, common multi-fiber connectors are MPO connectors and MT connectors. By using a connector to optically connect with the optical fiber cable, the multi-fiber drop cable assembly can be used as a part of a plug-and-play optical fiber distribution system.

The plurality of optical fibers (not shown) are separated and transitioned into at least one furcation leg 1403 at a furcation at the second end 1406 of the closure 1401. Each furcation leg 1403 has a first end attached to the furcation, a second end terminated by the optical connection port 1404, and a pre-determined length to reach a designated premise. The pre-determined lengths of furcation legs 1403 are uniquely engineered based on the distance between the closure 1401 and the designated premise to be served by the specified furcation leg. For example, the pre-determined length of each furcation leg 1403 is calculated based on a field survey that is conducted before the deployment of an FTTX system. Preferably, the pre-determined length of each furcation leg 1403 is up to 10% longer than the actual distance between the closure 1401 of the drop cable assembly 1400 and the designated premise.

The furcation leg 1403 that contains the output optical fiber is terminated by the optical connection port 1404 at the second end of the furcation leg 1403. The optical connection port 1404 mates the optical fiber inside the furcation leg 1403 with a corresponding optical fiber within the designated premise and optically connects those two fibers together. An optical network connection terminal located in the designated premise receives the specified optical connection port 1404 of the multi-fiber drop cable assembly 1400 to mate with and optically connect to the corresponding optical fiber within the designated premise. In one embodiment, the optical connection port 1404 at the second end of the furcation leg 1403 is a receptacle for receiving a connectorized optical fiber cable that contains the corresponding optical fiber within the designated premise. Alternatively, the optical connection port 1404 at the second end of the furcation leg 1403 is an optical fiber connector for mating with a receptacle of an optical fiber cable that contains the corresponding optical fiber within the designated premise. In preferred embodiments, each optical connection port 1404 may include an adapter or connector alignment sleeve for aligning the optical fibers of the opposing connectors.

To expedite the deployment of an FTTX system and to reduce the cost, the multi-fiber drop cable assembly 1400 may be pre-fabricated for example in a factory. Furthermore, preferably, the furcation legs 1403 with at least one optical fiber are spliced to the multi-fiber receptacle at the first end 1405 of the closure 1401 for the ease of manufacturing such a multi-fiber drop cable assembly in a factory. If the optical fibers are spliced to the multi-fiber receptacle, then a splice tray within the closure 1401 accommodates splice points between the receptacle and the optical fibers.

Although exemplary embodiments have been shown and described, it will be clear to those of ordinary skill in the art that a number of changes, modifications, or alterations to the disclosure as described may be made. For example, although FIGS. 11 to 16, only show a few furcation legs 1103 or 1403, it should be appreciated that (multi-fiber) drop cable assembly 1100 or 1400 may have any suitable number of furcation legs 1103 or 1403 depending on the application. Also, it should be appreciated that all optical fiber cables disclosed in the application are OSP rated and the cable jacket can be manufactured using polyethylene, polyvinylchloride (PVC), low-smoke zero halogen (LSZH), thermoplastic polyurethane (TPU), or other materials. All such changes, modifications, and alterations should therefore be seen as within the scope of the disclosure.

What is claimed is:

1. A drop cable assembly for a connectorized optical fiber cable, comprising:
   a closure having a receptacle at a first end, wherein the receptacle receives and terminates the connectorized optical fiber cable and the closure contains an input optical fiber optically connected to a corresponding optical fiber in the connectorized optical fiber cable;
   a splitter optically connected to the input optical fiber within the closure, wherein the splitter splits the input optical fiber into a plurality of output fibers;
   a plurality of furcation legs extending from a second end of the closure to the outside of the closure for separating the output optical fibers, wherein each furcation leg has pre-determined length to reach a designated premise;
   an optical connection port at the end of the furcation leg, wherein the optical connection port terminates the output optical fiber and is adapted to be mated with and optically connected to a corresponding optical fiber within the designated premise at the designated premise.

2. The drop cable assembly of claim 1 further comprises a splice tray to accommodate splice points between the splitter and the output optical fibers within the closure.

3. The drop cable assembly of claim 1, wherein the drop cable assembly is pre-fabricated.

4. The drop cable assembly of claim 1, wherein the splitter splits the input optical fiber into n output optical fibers, wherein n is a natural number.

5. The drop cable assembly of claim 4, wherein n is 4, 8, 12, 16, 20 or 24.

6. The drop cable assembly of claim 1, wherein the splitter is a planar light circuit (PLC).

7. The drop cable assembly of claim 1, wherein the pre-determined length of each furcation leg is calculated based on a field survey.

8. The drop cable assembly of claim 1, wherein the pre-determined length of each furcation leg is 0 to 10% longer than the actual distance between the closure of the drop cable assembly and the designated premise.

9. The drop cable assembly of claim 1, wherein the optical connection port at the end of the furcation leg is a receptacle for receiving a connectorized optical fiber cable that contains the corresponding optical fiber within the designated premise.

10. The drop cable assembly of claim 1, wherein the optical connection port at the end of the furcation leg is an optical fiber connector for mating with a receptacle of an optical fiber cable that contains the corresponding optical fiber within the designated premise.

11. The drop cable assembly of claim 1, wherein the drop cable assembly is outside plant (OSP) rated.

12. An FTTX network comprising:
   a connectorized optical fiber cable having at least one optical fiber along the length of the cable;
   a drop cable assembly for the connectorized optical fiber cable, comprising:
      a closure having a receptacle at a first end, wherein the receptacle receives and terminates the connectorized optical fiber cable and the closure contains an input optical fiber optically connected to the corresponding at least one optical fiber in the connectorized optical fiber cable;
      a splitter optically connected to the input optical fiber within the closure, wherein the splitter splits the input optical fiber into a plurality of output fibers;
      a plurality of furcation legs extending from a second end of the closure to the outside of the closure for separating the output optical fibers, wherein each furcation leg has a pre-determined length to reach a designated premise;

an optical connection port at the end of the furcation leg, wherein the optical connection port terminates the output optical fiber and is adapted to be mated with and optically connected to a corresponding optical fiber within the designated premise; and an optical network connection terminal for receiving the optical connection port of the drop cable assembly to mate with and optically connect to the corresponding optical fiber within the designated premise at the designated premise.

13. A multi-fiber drop cable assembly for a connectorized optical fiber cable, comprising:

a closure having a multi-fiber receptacle at a first end, wherein the receptacle receives and terminates the connectorized optical fiber cable and the closure contains a plurality of optical fibers optically connected to a corresponding plurality of optical fibers in the connectorized optical fiber cable;

a plurality of furcation legs extending from a second end of the closure to the outside of the closure for separating the optical fibers, wherein each furcation leg has a pre-determined length to reach a designated premise;

an optical connection port at the end of the furcation leg, wherein the optical connection port terminates the optical fiber and is adapted to be mated with and optically connected to a corresponding optical fiber within the designated premise at the designated premise.

14. The multi-fiber drop cable assembly of claim 13, wherein the connectorized optical fiber cable is terminated by a multi-fiber connector.

15. The drop cable assembly of claim 13 further comprises a splice tray to accommodate splice points between the multi-fiber receptacle and the plurality of optical fibers within the closure.

16. The multi-fiber drop cable assembly of claim 13, wherein the drop cable assembly is pre-fabricated.

17. The multi-fiber drop cable assembly of claim 13, wherein the pre-determined length of each furcation leg is calculated based on a field survey.

18. The multi-fiber drop cable assembly of claim 13, wherein the pre-determined length of each furcation leg is 0 to 10% longer than the actual distance between the closure of the drop cable assembly and the designated premise.

19. The multi-fiber drop cable assembly of claim 13, wherein the optical connection port at the second end of the furcation leg is a receptacle for receiving a connectorized optical fiber cable that contains the corresponding optical fiber within the designated premise.

20. The multi-fiber drop cable assembly of claim 13, wherein the optical connection port at the second end of the furcation leg is an optical fiber connector for mating with a receptacle of an optical fiber cable that contains the corresponding optical fiber within the designated premise.

21. The multi-fiber drop cable assembly of claim 13, wherein the multi-fiber drop cable assembly is outside plant (OSP) rated.

22. An FTTX network comprising:

a connectorized optical fiber cable having a plurality of optical fibers along the length of the cable;

a multi-fiber drop cable assembly for the connectorized optical fiber cable, comprising:

a closure having a multi-fiber receptacle at a first end, wherein the receptacle receives and terminates the connectorized optical fiber cable and the closure contains a plurality of optical fibers optically connected to the corresponding plurality of optical fibers in the connectorized optical fiber cable;

a plurality of furcation legs extending from a second end of the closure to the outside of the closure for separating the optical fibers, wherein each furcation leg has a pre-determined to reach a designated premise;

an optical connection port at the end of the furcation leg, wherein the optical connection port terminates the optical fiber and is adapted to be mated with and optically connected to a corresponding optical fiber within the designated premise; and an optical network connection terminal for receiving the optical connection port of the drop cable assembly to mate with and optically connect to the corresponding optical fiber within the designated premise at the designated premise.

* * * * *